(12) United States Patent
Anne et al.

(10) Patent No.: US 8,555,190 B2
(45) Date of Patent: Oct. 8, 2013

(54) APPARATUS AND METHOD FOR OPTIMIZING MAINTENANCE AND OTHER OPERATIONS OF FIELD DEVICES IN A PROCESS CONTROL SYSTEM USING USER-DEFINED DEVICE CONFIGURATIONS

(75) Inventors: Gowtham Anne, Bangalore (IN); Vibhor Tandon, Bangalore (IN)

(73) Assignee: Honeywell International Inc., Morristown, NJ (US)

( * ) Notice: Subject to any disclaimer, the term of this patent is extended or adjusted under 35 U.S.C. 154(b) by 474 days.

(21) Appl. No.: 12/856,526

(22) Filed: Aug. 13, 2010

(65) Prior Publication Data

US 2012/0004743 A1 Jan. 5, 2012

Related U.S. Application Data

(60) Provisional application No. 61/360,388, filed on Jun. 30, 2010.

(51) Int. Cl.
*G06F 3/048* (2013.01)

(52) U.S. Cl.
USPC .................... 715/771; 715/810; 715/970

(58) Field of Classification Search
USPC ............................... 715/771, 810, 970
See application file for complete search history.

(56) References Cited

U.S. PATENT DOCUMENTS

| | | | |
|---|---|---|---|
| 5,903,455 A | 5/1999 | Sharpe, Jr. et al. | |
| 5,960,214 A | 9/1999 | Sharpe, Jr. et al. | |
| 6,094,600 A | 7/2000 | Sharpe, Jr. et al. | |
| 7,054,695 B2 | 5/2006 | Opheim et al. | |
| 7,266,777 B2 * | 9/2007 | Scott et al. | 715/762 |
| 8,130,677 B2 * | 3/2012 | Barker et al. | 370/255 |
| 8,201,077 B2 * | 6/2012 | Reddy et al. | 715/221 |
| 8,214,752 B2 * | 7/2012 | Ferlitsch | 715/762 |
| 2005/0164684 A1 | 7/2005 | Chen et al. | |
| 2005/0222698 A1 | 10/2005 | Eryurek et al. | |
| 2007/0077665 A1 | 4/2007 | Bump et al. | |
| 2007/0078540 A1 | 4/2007 | Bump et al. | |

(Continued)

FOREIGN PATENT DOCUMENTS

EP 0 962 845 A2 12/1999

OTHER PUBLICATIONS

K. Thramboulidis, "Development of Distributed Industrial Control Applications: The CORFU Framework", 4th IEEE International Workshop on Factory Communication Systems, Vasteras, Sweden, Aug. 28-30, 2002, p. 1-8.
"What is a Device Description", Romilly Bowden 1999, www.romillv.com.uk/whatdd.htm, 4 pages.

(Continued)

*Primary Examiner* — David Phantana Angkool (57) ABSTRACT

A method includes receiving a request to access a field device and identifying a first device configuration associated with the field device. The first device configuration identifies (i) a subset of device parameters associated with the field device, (ii) a subset of device methods associated with the field device, and/or (iii) an interface arrangement of device parameters or methods associated with the field device. The method also includes retrieving a value for each device parameter identified by the first device configuration and generating a graphical user interface using the first device configuration and the retrieved values. The method could also include determining whether a user has requested use of the first device configuration. If not, the method can include identifying a second device configuration associated with the field device, retrieving the value for each device parameter identified by the second device configuration, and generating a second graphical user interface.

21 Claims, 7 Drawing Sheets

(56) References Cited

U.S. PATENT DOCUMENTS

| | | |
|---|---|---|
| 2007/0079250 A1 | 4/2007 | Bump et al. |
| 2007/0132779 A1 | 6/2007 | Gilbert et al. |
| 2008/0301703 A1 | 12/2008 | Nixon et al. |
| 2009/0064038 A1* | 3/2009 | Fleischman et al. ........... 715/810 |
| 2009/0271726 A1 | 10/2009 | Gavimath et al. |
| 2011/0022978 A1* | 1/2011 | Keller ........................... 715/771 |
| 2011/0022979 A1* | 1/2011 | Meier et al. .................... 715/810 |
| 2011/0060994 A1* | 3/2011 | Maxwell et al. .............. 715/730 |

OTHER PUBLICATIONS

"Digital fieldbus installations use EDDL for simplicity with advanced, full functionality", IEE Computing & Control Engineering, Dec./Jan. 2004/2005, p. 24-31.

"EDDL Overview", ISA, Apr. 16, 2007, 69 pages.

Notification of Transmittal of the International Search Report and the Written Opinion of the International Searching Authority, or the Declaration dated Jan. 2, 2012 in connection with International Patent Application No. PCT/US2011/041936.

* cited by examiner

APPARATUS AND METHOD FOR OPTIMIZING MAINTENANCE AND OTHER OPERATIONS OF FIELD DEVICES IN A PROCESS CONTROL SYSTEM USING USER-DEFINED DEVICE CONFIGURATIONS

CROSS-REFERENCE TO RELATED APPLICATIONS

This application claims priority under 35 U.S.C. §119(e) to U.S. Provisional Application Ser. No. 61/360,388 filed on Jun. 30, 2010, which is hereby incorporated by reference.

This disclosure is related to U.S. patent application Ser. No. 12/109,343 filed on Apr. 25, 2008, which is hereby incorporated by reference.

TECHNICAL FIELD

This disclosure relates generally to process control systems. More specifically, this disclosure relates to an apparatus and method for optimizing maintenance and other operations of field devices in a process control system using user-defined device configurations.

BACKGROUND

Processing facilities are often managed using process control systems. Example processing facilities include manufacturing plants, chemical plants, crude oil refineries, and ore processing plants. Among other operations, process control systems typically manage the use of motors, valves, and other industrial equipment in the processing facilities.

Conventional process control systems routinely include a large number of field devices, such as sensors and actuators. Communications with field devices often occur using various standard or other protocols, such as HART, FOUNDATION Fieldbus, or Control Net. These types of protocols often support the use of a structured language called a Device Description Language ("DDL"). A DDL language can be used to create device description or electronic device description ("DD/EDD") files, which describe the online functional behavior of the field devices.

The DD/EDD files can be interpreted by a host application and used to generate user interfaces. The user interfaces allow personnel to configure and diagnose the field devices. In conventional systems, the host application typically loads an entire DD/EDD file for a field device and then presents a user with the complete configuration capabilities of the field device.

SUMMARY

This disclosure provides an apparatus and method for optimizing maintenance and other operations of field devices in a process control system using user-defined device configurations.

In a first embodiment, a method includes receiving a request to access a field device associated with a process control system. The method also includes identifying a first device configuration associated with the field device. The first device configuration identifies (i) a subset of device parameters associated with the field device, (ii) a subset of device methods associated with the field device, and/or (iii) an interface arrangement of device parameters or methods associated with the field device. The method further includes retrieving a value for each device parameter identified by the first device configuration and generating a graphical user interface using the first device configuration and the retrieved values.

In a second embodiment, an apparatus includes at least one memory configured to store a first device configuration associated with a field device in a process control system. The first device configuration identifies (i) a subset of device parameters associated with the field device, (ii) a subset of device methods associated with the field device, and/or (iii) an interface arrangement of device parameters or methods associated with the field device. The apparatus also includes at least one processing unit configured to retrieve a value for each device parameter identified by the first device configuration and to generate a graphical user interface using the first device configuration and the retrieved values.

In a third embodiment, a computer readable medium embodies a computer program. The computer program includes computer readable program code for identifying a first device configuration associated with a field device in a process control system. The first device configuration identifies (i) a subset of device parameters associated with the field device, (ii) a subset of device methods associated with the field device, and/or (iii) an interface arrangement of device parameters or methods associated with the field device. The computer program also includes computer readable program code for retrieving a value for each device parameter identified by the first device configuration. In addition, the computer program includes computer readable program code for generating a graphical user interface using the first device configuration and the retrieved values.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 8, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
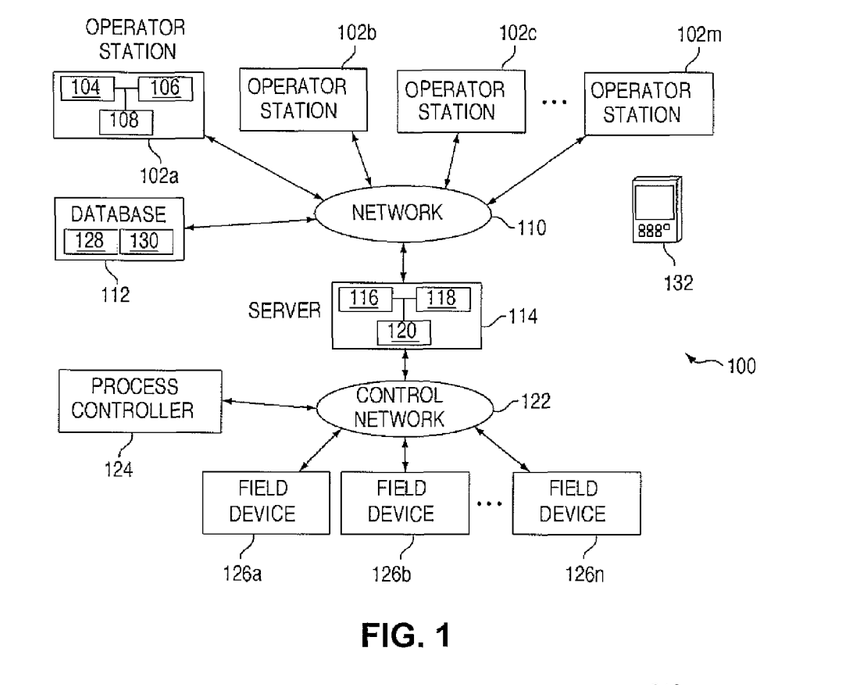
FIG. 1 illustrates an example process control system according to this disclosure.

FIG. 1 illustrates an example process control system 100 according to this disclosure. As shown in FIG. 1, the system 100 includes multiple operator stations 102a-102m, which provide users with the capability of managing or otherwise interacting with various other devices. The operator stations 102a-102m could also provide various other capabilities, such as allowing users to configure process control strategies manually. As a particular example, the operator stations 102a-102m could display user interfaces that personnel can use to manage field devices 126a-126n. A user interface could display various screens to a user, receive user inputs, and provide responses. Each operator station 102a-102m includes any suitable structure, such as a computing device, for supporting user access or control of one or more devices. In particular embodiments, each operator station 102a-102m includes one or more processing devices 104 (such as a microprocessor, microcontroller, DSP, FPGA, or ASIC), one or more memories 106 storing instructions and data used, generated, or collected by the processing device(s), and one or more network interfaces 108 supporting communication over at least one network (such as an Ethernet interface).

A network 110 facilitates communication between various components of the system 100, such as between the operator stations 102a-102m, a database 112, and a server 114. The network 110 includes any suitable structure for facilitating communications between networked components. The network 110 could also support any suitable communication protocols or technologies, such as Ethernet, ATM, or TCP/IP.

The database 112 provides a central repository for storing information related to various devices in the system 100. For example, the database 112 could store information related to the field devices 126a-126n or maintenance schedules of the field devices 126a-126n. At least some of the stored information can be retrieved and displayed on the operator stations 102a-102m to users. The database 112 includes any suitable structure supporting the storage and retrieval of information.

The server 114 supports various functions, depending on the implementation of the system 100. For example, the server 114 can help to retrieve information from the database 112 and provide the retrieved information to the operator stations 102a-102m. The server 114 can also interface with process control components to control an industrial process based on user input from the operator stations 102a-102m. The server 114 includes any suitable computing device for executing one or more functions. In particular embodiments, the server 114 includes one or more processing devices 116, one or more memories 118 storing instructions and data used, generated, or collected by the processing device(s), and one or more network interfaces 120 supporting communication over at least one network.

A control network 122 couples the server 114 and a process controller 124 with various field devices 126a-126n. The control network 122 includes any suitable structure for facilitating communications to and from process control components. For example, the control network 122 may contain various network devices (such as multiplexors, modems, or termination panels) operating according to one or more protocols (such as HART, FOUNDATION Fieldbus, or Control Net).

The process controller 124 can issue commands to control the operation of the field devices 126a-126n in order to implement a desired control strategy in the industrial environment being controlled. The desired control strategies could be programmed by the server 114 using control strategies that are specified in the database 112 based on inputs received from operator stations 102a-102m. The process controller 124 may receive various status information from the field devices 126a-126n, which are used in various decision points (such as IF conditions) within a control strategy. The process controller 124 includes any suitable structure for implementing one or more control strategies.

The field devices 126a-126n can implement a wide variety of functions in a process control system to monitor or control an industrial process. For example, the field devices 126a-126n could represent sensors measuring various process variables (such as temperature or pressure sensors). The field devices 126a-126n could also represent actuators for altering operation of an industrial process (such as valves). The field devices 126a-126n could further represent relays or any other devices that perform various operations under the control of a process controller.

As noted above, each field device's manufacturer may provide a device description or electronic device description ("DD/EDD") file 128 for that field device 126a-126n. A DD/EDD file 128 represents a machine-readable file containing information relating to a field device. In some embodiments, the information could include:

information about device parameters (such as codings, names, engineering units, and how to display the parameters);
an arrangement of the parameters in a menu structure;
names of menus and submenus;
information about operating interactions (device methods), such as calibration methods; and
information about visualization tools, such as charts and graphs.

In particular embodiments, the DD/EDD files 128 can be stored in the database 112. Note, however, that the DD/EDD files 128 could be stored at any other suitable location(s) and in any other suitable storage device(s), such as on a removable storage device like a Flash memory or at a manufacturer's web server and downloaded through a communication link.

The server 114 can receives commands from the operator stations 102a-102m related to setting up, configuring, utilizing, and monitoring of the field devices 126a-126, and the server 114 can execute the corresponding actions. For example, utilizing a sensor field device may require the server 114 to (i) receive the parameters being measured by the field device using the process controller 124 via the control network 122 and (ii) return the information to the operator station that issued a status request command or other command. Data in the database 112 may also be retrieved and returned to the application that issued a command in response to corresponding command types.

As noted above, the operator stations 102a-102m can display user interfaces that allow personnel to interact with and monitor the field devices 126a-126n. For example, a host application executed by the server 114 could load the DD/EDD file 128 for a field device, use the DD/EDD file 128 to create the user interface, and provide the user interface to the operation station for display. A user at the operator station can use screens of the user interface to interact with and manage the field device.

In conventional systems, when the host application loads a DD/EDD file 128, the user interface presented to the user includes the complete configuration capabilities of the field device. In the case of a complex field device, the complete configuration capabilities could contain a large number of parameters spanning across multiple interface screens, such as multiple menus, dialog boxes, or separate forms. The server 114 also typically needs to fetch the values for all of these parameters, such as from the database 112, process controller 124, or field device. This can often take a lengthy amount of time.

Often times, a user does not wish or need to have access to the complete configuration capabilities of a field device. For example, a maintenance operation may involve a user examining certain parameters to see if a field device requires maintenance. During a plant running phase, a user may only need to see certain parameters related to the operation of a field device. In these or other situations, the user may only be interested in viewing a subset of the field device's parameters and methods. In conventional systems, however, the host application would retrieve values for all parameters defined in the DD/EDD file 128, and the user would be required to navigate across multiple user interface screens.

In accordance with this disclosure, the system 100 supports a mechanism for creating and using user-defined custom device configurations. Each custom device configuration could include a subset of field device parameters and methods, such as only those parameters and methods needed for maintenance personnel to perform regular maintenance operations. When a custom device configuration is loaded, only parameter values for the parameters in the custom device configuration are retrieved, which can reduce waiting or loading times. Moreover, the parameters and methods can be presented in a user-specified manner (such as with dialog boxes, groups, graphs, and charts) within one or more user interface screens, which can greatly simplify navigation.

In this way, a user can more quickly view the user interface, and the user interface can be used more easily to perform that user's designated operations. However, the user can be given the option of opening and viewing the complete device configuration for the field device. This provides greater flexibility while still allowing access to a device's complete configuration.

In particular embodiments, the server 114 executes a host application such as the FIELD DEVICE MANAGER (FDM) from HONEYWELL INTERNATIONAL INC. Also, each custom device configuration could be stored in any suitable location, such as on an operator station, the server 114, or the database 112 as a device configuration file 130. The custom configuration can be stored in any format that is understood by the host application, such as an XML template.

Additional details regarding the creation and use of the custom device configurations are provided below. Note that multiple user-defined device configurations can be created in the system 100, which allows different users to use their own device configurations to retrieve different device information. This may be particularly useful when different users have distinctly different job functions and therefore require different information from the same field device. A single user could also create multiple custom device configurations, which may be useful when the user performs multiple job functions (such as regular maintenance, status monitoring, and live process value monitoring).

Also note that custom device configurations can be used in any other suitable manner. For example, custom device configurations can be uploaded to one or more portable devices 132, such as via wireless communications or wired connections. Each portable device 132 could also communicate in either a wired or wireless manner with one or more field devices 126*a*-126*n*, such as via infrared or other wireless communications or through a physical connection. The portable device 132 could retrieve information from the field devices and provide the information to a user via custom user interfaces defined in the device configurations.

Each portable device 132 could represent any suitable handheld or other portable device that can use device configurations to perform one or more operations. As a particular example, the portable device 132 could be used by maintenance or other personnel to perform specialized maintenance or other operations. The portable device 132 could present the personnel with specified user interfaces defined by the custom device configurations, and the portable device 132 can download values for parameters listed in the custom device configurations. This allows the personnel using the portable device 132 to similarly use custom device configurations to interact with various field devices. Of course, the personnel could also be given the option of using a complete device configuration for a field device. In addition, the portable device 132 could actually be used to create one or more custom device configurations. These custom device configurations could then be provided from the portable device 132 for storage, such as in the database 112.

Although FIG. 1 illustrates one example of a process control system 100, various changes may be made to FIG. 1. For example, the process control system 100 could include any number of field devices, networks, servers, operator stations, control system components, and portable devices. Also, the makeup and arrangement of the system 100 is for illustration only. Further, FIG. 1 illustrates one example operational environment in which user-defined custom device configurations can be used. This functionality could be used in any suitable system.

In addition, the description above and the following description describe the use of DD/EDD files. However, any other device descriptions could be used. A device description is often provided by a vendor associated with a field device, and the device description includes information indicating various device capabilities. The device capabilities can include the manner in which the field device may behave in different conditions, management commands that can be sent to the field device, and status information or results of execution of management commands that can be viewed. Device descriptions are often provided in the form of files, such as DD/EDD files, Common File Format (CFF) files, value files, or any other auxiliary data source pertaining to a field device.

Figure 2:
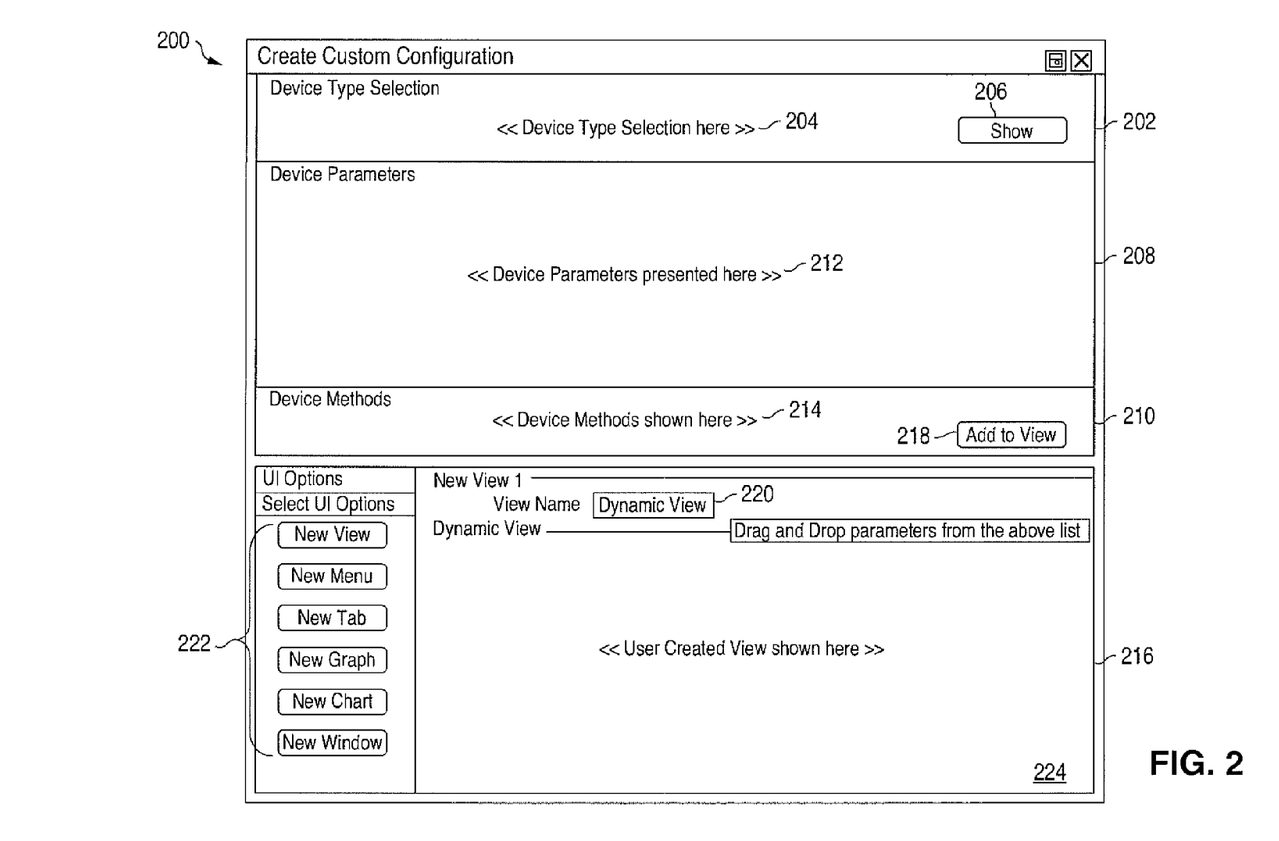
FIGS. 2 through 6 illustrate example interfaces for creating and using custom user-defined device configurations according to this disclosure.
Figure 3:
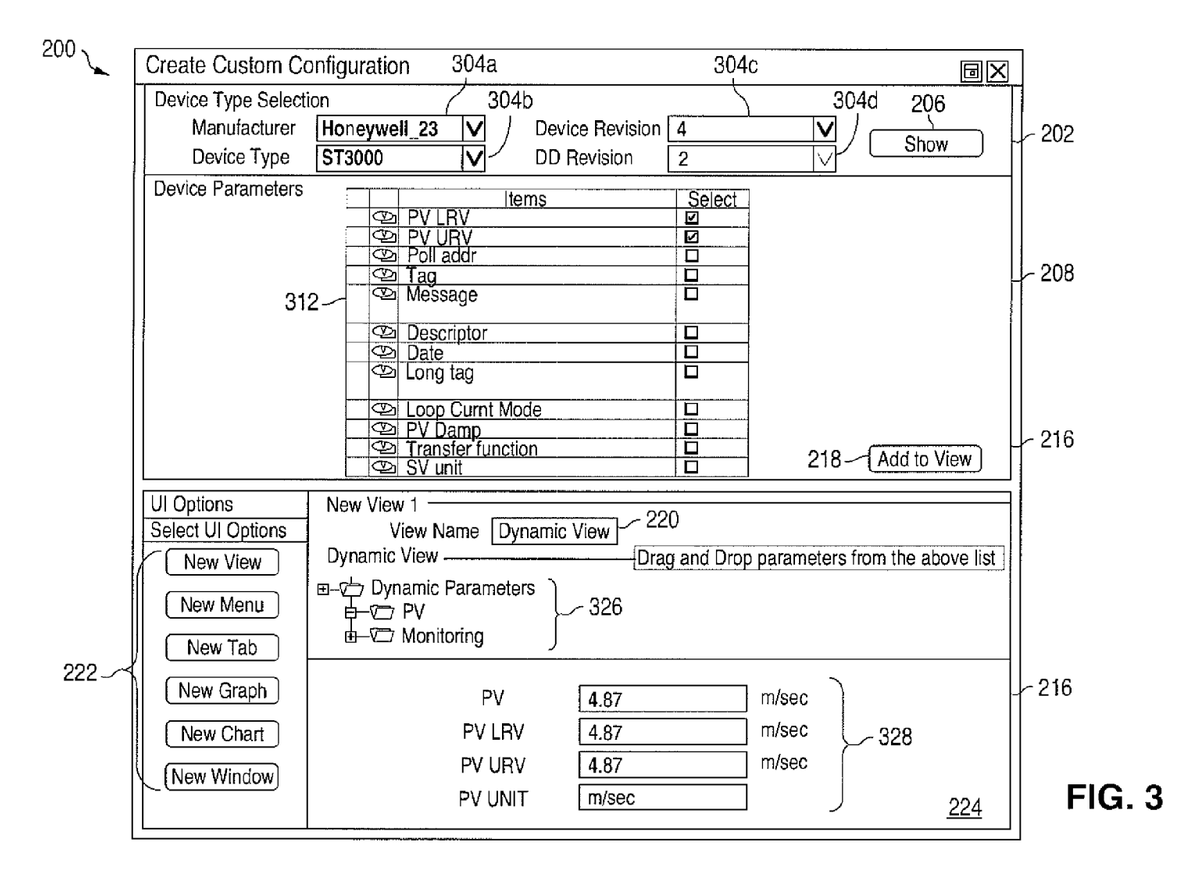
Figure 4:
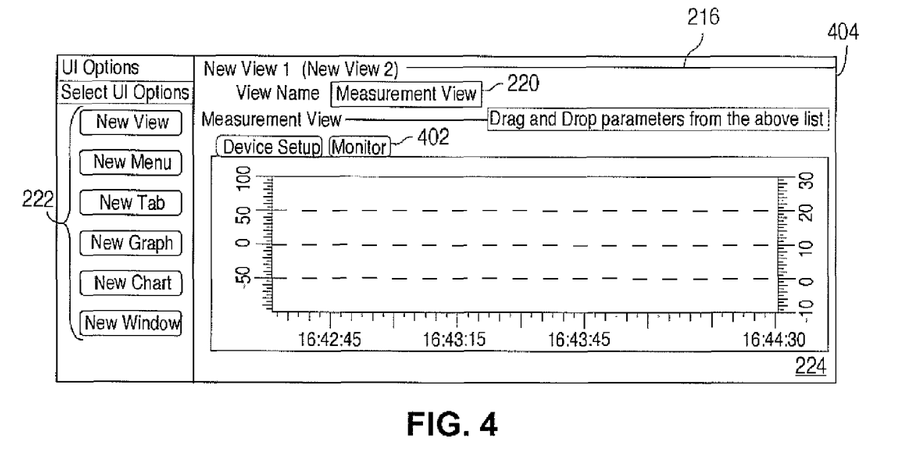
Figure 5:
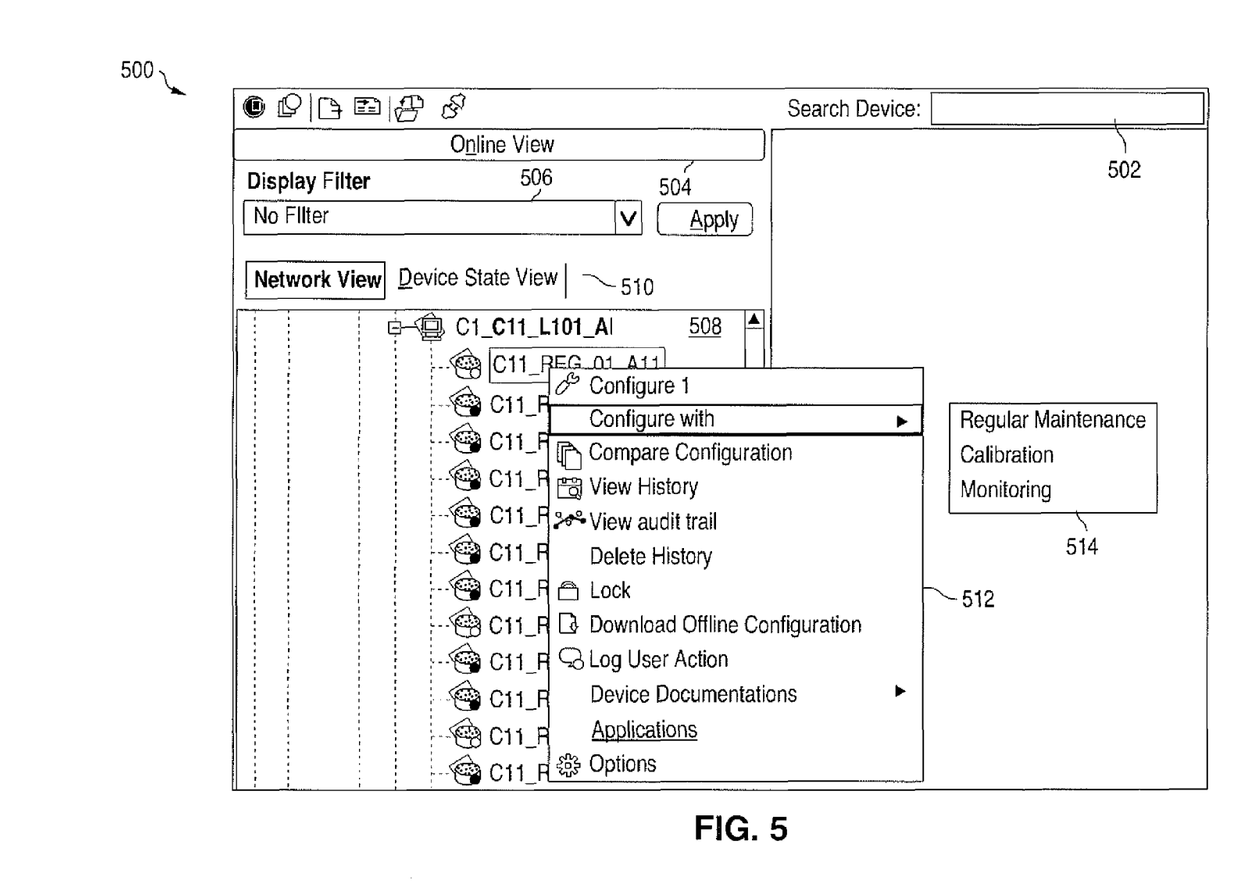
Figure 6:
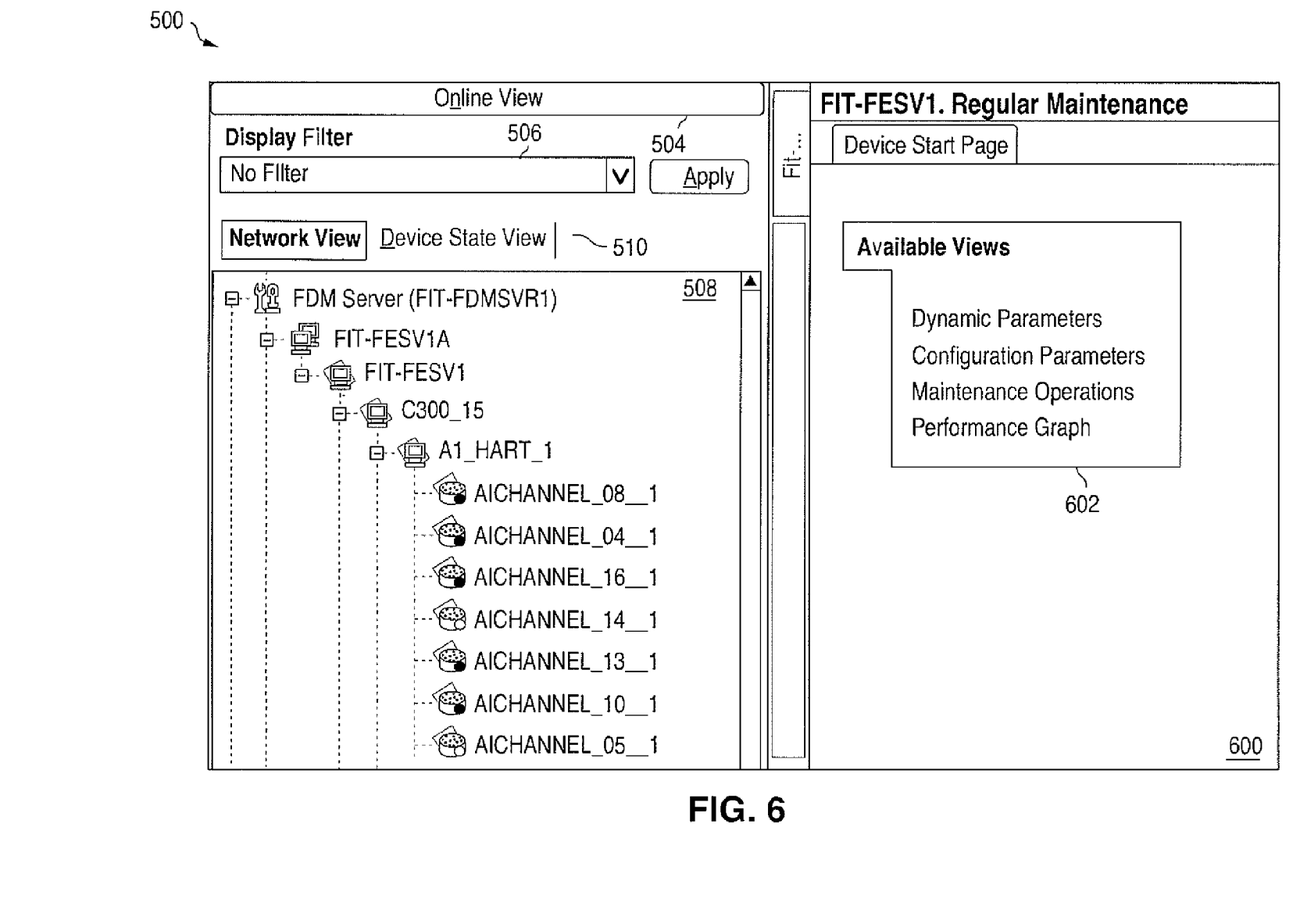

FIGS. 2 through 6 illustrate example interfaces for creating and using custom user-defined device configurations according to this disclosure. In particular, FIGS. 2 through 4 illustrate an example screen 200 for collecting information from a user for defining a custom device configuration, and FIGS. 5 and 6 illustrate an example screen 500 for using a custom device configuration.

As shown in FIG. 2, the screen 200 includes a device type selection panel 202. In this panel 202, a user can select a device type for which he or she wants to create a custom configuration. A selection area 204 can contain various graphical user interface elements (such as drop-down menus or other elements) for selecting a particular device type. After a device type has been selected, a "Show" button 206 can be depressed in order to view one or more lists of parameters and methods associated with the selected device type.

The list of device parameters is presented in a parameter selection panel 208, and the list of device methods is presented in a method selection panel 210. In each panel 208-210, the list of parameters or methods could include a mechanism for selecting individual parameters or methods. For example, a selection area 212 in the panel 208 could include a list of parameters and a checkbox for selecting each individual parameter. Similarly, a selection area 214 in the panel 210 could include a list of methods and a checkbox for selecting each individual method. The lists of parameters and methods can be obtained by parsing the DD/EDD file 128 of the selected device type. In some embodiments, the list of methods in the panel 210 could include methods that are defined in the DD/EDD file for performing specific operations on a device in an atomic fashion (including sequences of commands to the device based on user inputs). Example methods can include "calibration" or "partial valve stroke" methods.

The screen 200 further includes an interface definition panel 216 in which a customized user interface can be defined. In some embodiments, the system 100 can automatically create a user interface containing the parameters and methods selected in the panels 208-210. However, if the user wishes to create a custom interface containing the parameters and methods selected in the panels 208-210, the user can do so using the panel 216. A customized user interface can include one or multiple "views," each of which may include various device parameters or methods. For instance, the user could "drag and drop" selected parameters and methods into the panel 216. Each panel 208-210 could also include checkboxes or other mechanisms for selecting some or all of the parameters or methods, and the user could depress an "Add to View" button 218 to add the selected parameters or methods to the view.

The panel 216 includes a view name 220, which represents a name assigned (by the user or automatically) to a view being created in a custom user interface. The panel 216 also includes interface selection buttons 222, which allow the user to create different views or add different elements into the views. In this example, the buttons 222 allow the user to create a new view or add a menu, tab, graph, chart, or window to a view. Of course, any other or additional elements could be supported by the buttons 222.

When the user selects the "New View" button 222, the user can enter a name of the view in the text box of the view name 220. When the user selects any other button 222 in FIG. 2, the corresponding element (menu, tab, graph, chart, or window) can be inserted into a dynamic view area 224. The dynamic view area 224 shows how the view is arranged or can appear when invoked. For example, the dynamic view area 224 could show how various menus, tabs, graphs, charts, or windows are laid out.

Examples of this functionality are shown in FIGS. 3 and 4. As shown in FIG. 3, the device type selection panel 202 includes various drop-down menus 304a-304d, which can be used to identify a field device manufacturer and device type. If appropriate, the user can also select a particular device revision or DD/EDD file revision. In this example, the user has selected revision four of an ST3000 device from HONEYWELL INTERNATIONAL INC.

Once selected, the user can depress the "Show" button 206, which presents the user with a table 312 in the parameter selection panel 208. The table 312 identifies the device parameters associated with the selected ST3000 device, along with checkboxes for selecting various ones of those parameters. Note that this example omits the method selection panel 210, which could contain any device methods for the selected field device.

Using the "drag and drop" technique or the checkboxes and the "Add to View" button 218, the user can insert selected device parameters into the interface definition panel 216. In this example, the user has selected to create a view by clicking on the "New View" button 222, and the user has named the new view in the view name 220. The user has also selected the "New Menu" button 222 once or several times to generate a menu tree 326. The menu tree 326 indicates that the user has created a menu labeled "Dynamic Parameters" with submenus labeled "PV" and "Monitoring." The user has further added various selected parameters 328 to the "PV" submenu.

FIG. 4 illustrates an interface definition panel 216 where the user has added another view with the name "Measurement View." The "New Tab" button 222 has been selected to add two tabs 402 named "Device Setup" and "Monitor." Inside the "Device Setup" tab, the user could add various parameters that are needed to set up a field device of the selected type. Inside the "Monitor" tab, the user has selected the "New Graph" button 222 to add a graph 404. The user could then drag and drop or otherwise add desired parameters to the graph.

Once completed, the user can select the "save" option (image of a disk) at the top right of the window to save the custom configuration with a particular name. The user can create multiple configurations and use them whenever he or she is performing specific operations on the devices. In this way, users can create various device configurations, each of which can contain views with specific parameters of interest to the users. The views can be organized in ways that the users are comfortable with for specific device operations.

As shown in FIG. 5, the screen 500 can be used by a user to find, select, and configure different field devices in a system. In this example, the screen 500 includes various mechanisms for finding a field device to be selected. For example, a search text box 502 allows a user to enter a name or other search parameter(s) for locating any field devices matching the parameter(s). Also, an "Online View" button 504 can be selected to view online field devices (a similar "Offline View" button could be used to view offline field devices). A "Display Filter" mechanism 506 can be used to create custom views of a system, where those views can contain a subset of the equipment in the system (such as the equipment associated with a particular unit). A display area 508 presents a list of equipment, either in the entire system or in a portion thereof. Buttons 510 can be used to toggle the list of field devices in the display area 508 between a network view (arranged hierarchically as in the system) and a device state view (grouped according to device status).

However a field device is located, once the desired field device is shown in the display area 508, the user can choose to access the selected device using the standard device configuration or one or more custom device configurations. In this example, the user has "right clicked" on a field device or taken other action to present a context menu 512. The menu 512 includes various functions that can be invoked by the user. The "Configure" option can be used by the user to access the field device using the standard device configuration mechanism. Selecting this option would cause the system 100 to retrieve the field device's DD/EDD file 128 and present the user with the standard user interface defined in the DD/EDD file.

The "Configure With" option can be used to select one of one or more custom device configurations that have been created for the selected field device from a list 514. In this example, three different custom device configurations have been created. Each custom device configuration can be associated with different device parameters, different device methods, and/or different user interface designs. The user could select one of the custom device configurations shown in the list 514, such as the custom device configuration associated with the current job function being performed by the user. Selecting one of the custom configurations causes the system 100 to present to the user the custom user interface associated with the selected custom configuration.

As shown in FIG. 6, selection of the "Regular Maintenance" configuration in the list 514 presents the user with a custom user interface 600 as shown in FIG. 6. The user interface 600 is incorporated into the screen 500 in this example, although that need not be the case. As shown here, the custom user interface 600 includes a list 602 of different views that can be selected by the user. Each view could be associated with a subset of device parameters and methods, and those parameters and methods can be arranged using menus, tabs, graphs, charts, or windows as defined in the custom configuration.

In this way, the user can select a custom device configuration that is appropriate for the functions to be performed by that user. The selected device configuration could include only those device parameters and methods needed or required for the user to perform his or her functions. Also, the device parameters and methods can be arranged in an intuitive or other appropriate manner for the user. As a result, the system 100 can more quickly acquire the necessary data for presentation to the user (since the system may not need to acquire data for every device parameter and method). Moreover, the user may not need to navigate through complex menus or other interfaces filled with irrelevant information to reach the parameters and methods of interest to the user.

Although FIGS. 2 through 6 illustrate examples of interfaces for creating and using custom user-defined device configurations, various changes may be made to FIGS. 2 through 6. For example, each screen shown in FIGS. 2 through 6 could have any other layout or design, and each screen could include any other or additional information according to particular needs. Also, while various input or output mechanisms (such as menus, graphs, tables, checkboxes, and right-click context menus) are shown and described above, any other or additional input or output mechanisms could be used to provide information to or receive information from a user.

Figure 7:
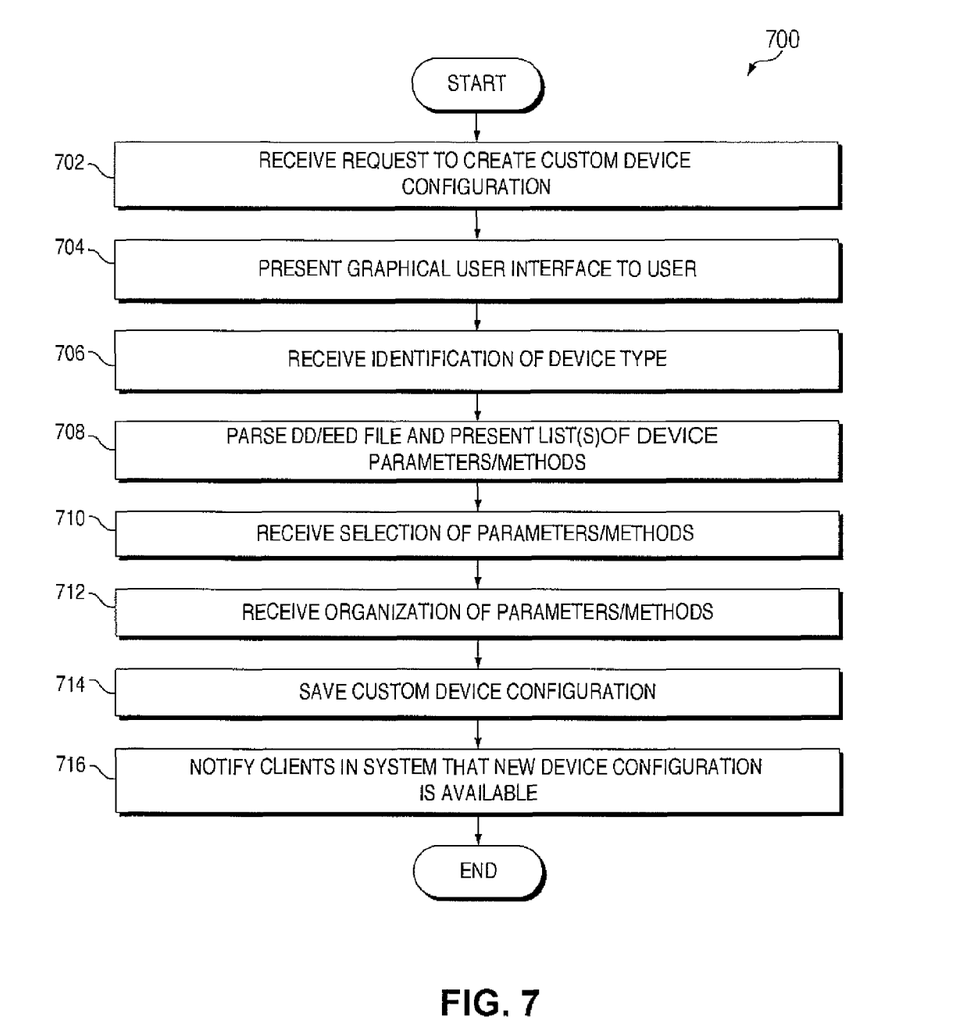
FIGS. 7 and 8 illustrate example methods for creating and using custom user-defined device configurations according to this disclosure.
Figure 8:
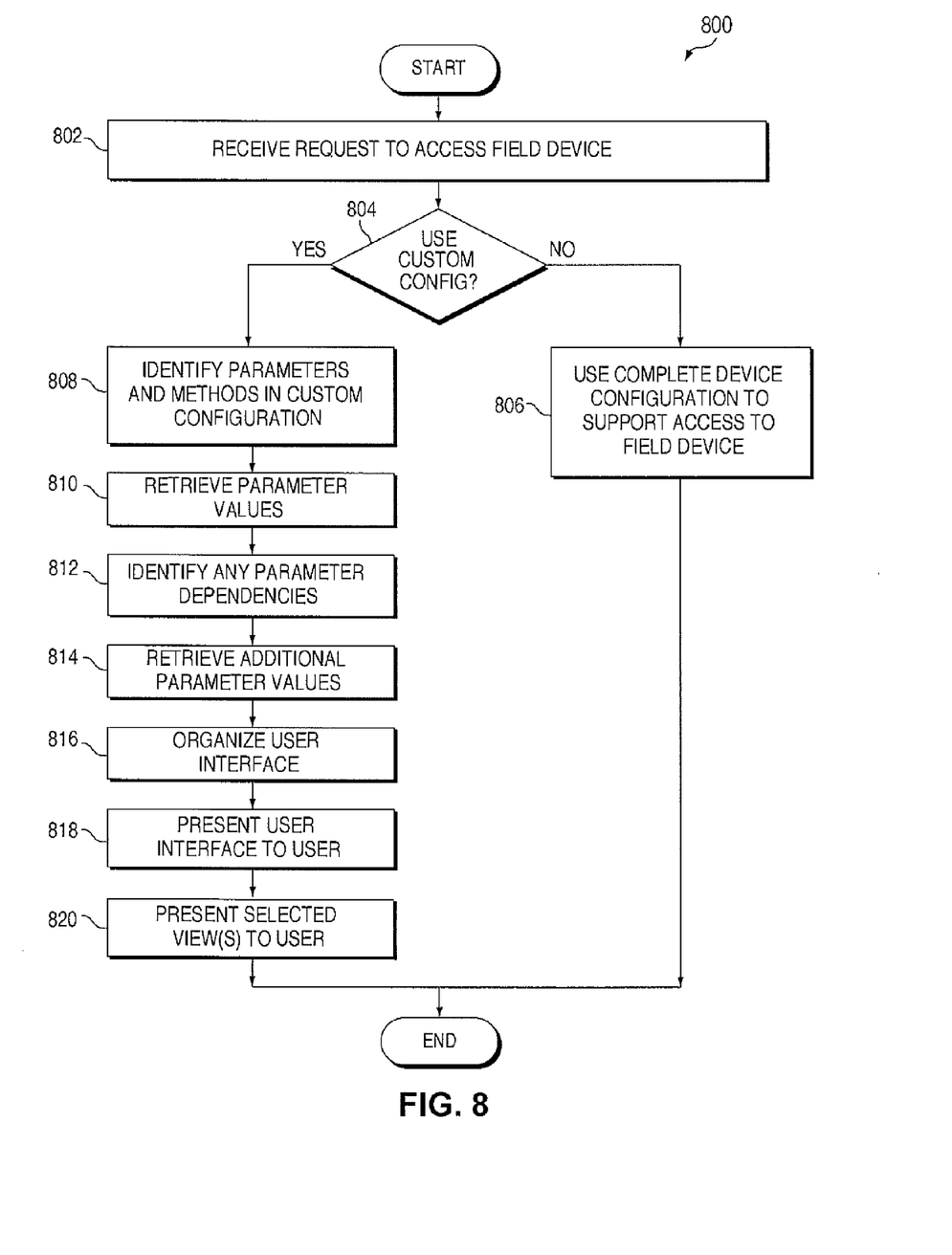

FIGS. 7 and 8 illustrate example methods for creating and using custom user-defined device configurations according to this disclosure. As shown in FIG. 7, a method 700 is used to create a customized device configuration. A request to create a custom device configuration is received at step 702. This could include, for example, the host application executed by the server 114 receiving a request to create a custom device configuration from an operator station 102a-102m. A graphical user interface is presented to the user at step 704. This could include, for example, the server 114 generating the screen 200 and providing the screen 200 to the operator station 102a-102m for display.

An identification of a device type is received at step 706. This could include, for example, the user using various drop-down menus or other input mechanisms in the device type panel 202 to identify a desired device type. The DD/EDD file of the selected device type is parsed, and one or more lists of device parameters or methods are presented to the user at step 708. This could include, for example, the host application retrieving the DD/EDD file 128 for the selected device type from the database 112. This could also include the host application presenting a list of the device parameters in the parameter selection panel 208 and a list of the device methods in the method selection panel 210.

A selection of one or more device parameters and methods is received at step 710, and an organization of the selected parameters and methods is received at step 712. This could include, for example, the user choosing a subset or all of the device parameters and methods using checkboxes. This could also include the user creating menus, tabs, or other organizational structures and inserting the selected parameters and methods into the organizational structures. This could further include the user creating charts, graphs, or other visual indicators of the parameters.

The custom device configuration is saved at step 714, and clients in the system are notified of the new device configuration at step 716. This could include, for example, the host application saving the new configuration as a device configuration file 130. This could also include the host application notifying the operator stations 102a-102m that a new device configuration can be selected by other users in the system. Note that the notification is optional and could be limited or omitted, such as when only certain types of users are notified of the new configuration.

As shown in FIG. 8, a method 800 is provided for using a customized device configuration. A request to access a field device is received at step 802. This could include, for example, the host application executed by the server 114 presenting the screen 500 to an operator station 102a-102m. A user can use the screen 500 to select a field device and request access to the device.

A determination is made whether to use a custom device configuration at step 804. This could include, for example, the host application determining whether the user identified a specific device configuration to be used. This may also include the host application determining if the user has previously indicated that he or she wants to always use a particular custom or default device configuration. If a custom device configuration is not to be used, the complete device configuration is used to support access to the field device at step 806. This could include, for example, the host application retrieving the selected field device's DD/EDD file 128 and presenting the complete user interface as defined in the DD/EDD file to the user.

If a custom device configuration is to be used, the system identifies the device parameters and methods associated with the custom configuration at step 830. This could include, for example, the host application identifying the parameters and methods that were previously selected for inclusion in the custom device configuration file 130. Note that only a subset of the device's parameters and methods may be included in a custom device configuration, or all of the device's parameters and methods may be included (but arranged differently than the standard interface) in a custom device configuration. Parameter values for the parameters in the custom device configuration are retrieved at step 810. This could include, for example, the host application retrieving the parameter values from the field device, database 112, or process controller 124.

Any parameter dependencies are identified at step 812, and any necessary additional parameter values can be retrieved at step 814. In these steps, the host application can determine whether any selected parameters in the custom device configuration depend on other parameters not selected in the custom device configuration. A particular example of this might occur when the custom device configuration includes a measurement parameter from a sensor but does not include the "units" parameter for the measurement. A measurement value of "10" could be retrieved for that parameter, but this measurement is typically meaningless without the unit of measurement (such as "cm/s" or "kg/mm$^3$"). The host application can identify these dependencies and resolve them internally.

A user interface is organized at step 816 and presented to the user at step 818. This could include, for example, the host application identifying any views defined in the custom device configuration. This could also include the host application identifying the parameters, methods, charts, graphs, or other contents to be included in each view. This could further include the host application generating an interface that lists the views. At this point, the user is able to select different views at step 820. Each view can contain only those device parameters and methods needed by the user and organized in a manner desired by the user. Note that if a single view is defined in a custom device configuration, the contents of the view could be presented to the user without requiring selection of that view. The actual interface presented to the user could vary in other ways depending on how the interface is defined in the custom configuration.

Although FIGS. 7 and 8 illustrate examples of methods for creating and using custom user-defined device configurations, various changes may be made to FIGS. 7 and 8. For example, while shown as a series of steps, the steps in each figure could overlap, occur in parallel, occur in a different order, or occur multiple times.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory ("ROM"), random access memory ("RAM"), a hard disk drive, a compact disc ("CD"), a digital video disc ("DVD"), or any other type of memory.

It may be advantageous to set forth definitions of certain words and phrases used throughout this patent document. The term "couple" and its derivatives refer to any direct or indirect communication between two or more elements, whether or not those elements are in physical contact with one another. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
   receiving a request to access a field device associated with a process control system;
   determining whether a user has requested use of a first device configuration to access the field device, the first device configuration identifying at least one of: (i) a subset of device parameters associated with the field device, (ii) a subset of device methods associated with the field device, and (iii) an interface arrangement of device parameters or methods associated with the field device;
   if a determination is made that the user has requested use of the first device configuration:
      retrieving a first value for each device parameter identified by the first device configuration; and
      generating a first graphical user interface using the first device configuration and the first retrieved values; and
   if a determination is made that the user has not requested use of the first device configuration:
      retrieving a second value for each device parameter identified by a second device configuration, the second device configuration identifying (i) all of the device parameters associated with the field device and (ii) all of the device methods associated with the field device; and
      generating a second graphical user interface using the second device configuration and the second retrieved values.

2. The method of claim 1, wherein:
   the subset of device parameters comprises one or more first device parameters; and
   if the determination is made that the user has requested use of the first device configuration, the method further comprises:
      identifying at least one first device parameter that is dependent on a second device parameter not identified in the subset of device parameters; and
      retrieving a value of the second device parameter.

3. The method of claim 1, wherein generating the first graphical user interface comprises:
   generating a list of views, each view associated with one or more of the device parameters or methods;
   receiving a selection of one of the views from the user; and
   presenting the selected view to the user.

4. The method of claim 1, further comprising:
   generating the first device configuration.

5. The method of claim 4, wherein generating the first device configuration comprises:
   receiving an identification of a device type;
   identifying at least one of the device parameters and the device methods using a device description associated with the device type; and
   receiving information identifying at least one of: (i) the subset of device parameters, (ii) the subset of device methods, and (iii) the interface arrangement of device parameters or methods.

6. The method of claim 5, wherein receiving the information identifying the interface arrangement comprises:
   receiving a selection of components for the first graphical user interface;
   associating at least some of the device parameters or methods with the components of the first graphical user interface; and
   generating a graphical display showing the arrangement of the components.

7. The method of claim 1, wherein generating the first or second graphical user interface comprises communicating data defining the first or second graphical user interface from a server to an operator station for presentation to the user.

8. The method of claim 1, further comprising:
   receiving the first device configuration at a portable device;
   wherein the portable device performs the receiving, identifying, retrieving, and generating steps.

9. The method of claim 1, wherein:
   the first device configuration comprises one of multiple customized device configurations associated with the field device; and
   the second device configuration comprises a default device configuration.

10. The method of claim 1, wherein the device parameters and device methods are identified using a device description/electronic device description ("DD/EDD") file associated with the field device.

11. An apparatus comprising:
    at least one memory configured to store:
       a first device configuration associated with a field device in a process control system, the first device configuration identifying at least one of: (i) a subset of device parameters associated with the field device, (ii) a subset of device methods associated with the field device, and (iii) an interface arrangement of device parameters or methods associated with the field device; and a second device configuration associated with the field device, the second device configuration identifying (i) all of the device parameters associated with the field device and (ii) all of the device methods associated with the field device; and at least one processing unit configured to:
determine whether a user has requested use of the first device configuration;
if a determination is made that the user has requested use of the first device configuration, retrieve a first value for each device parameter identified by the first device configuration and generate a first graphical user interface using the first device configuration and the first retrieved values; and
if a determination is made that the user has not requested use of the first device configuration, retrieve a second value for each device parameter identified by the second device configuration and generate a second graphical user interface using the second device configuration and the second retrieved values.

12. The apparatus of claim 11, wherein:
the subset of device parameters comprises one or more first device parameters; and
if the determination is made that the user has requested use of the first device configuration, the at least one processing unit is further configured to:
identify at least one first device parameter that is dependent on a second device parameter not identified in the subset of device parameters; and
retrieve a value of the second device parameter.

13. The apparatus of claim 11, wherein the at least one processing unit is configured to generate the first graphical user interface by:
generating a list of views, each view associated with one or more of the device parameters or methods;
receiving a selection of one of the views from the user; and
presenting the selected view to the user.

14. The apparatus of claim 11, wherein the at least one processing unit is further configured to generate the first device configuration by:
receiving an identification of a device type;
identifying at least one of the device parameters and the device methods using a device description associated with the device type; and
receiving information identifying at least one of: (i) the subset of device parameters, (ii) the subset of device methods, and (iii) the interface arrangement of device parameters or methods.

15. The apparatus of claim 14, wherein the at least one processing unit is configured to generate the first device configuration further by:
receiving a selection of components for the first graphical user interface;
associating at least some of the device parameters or methods with the components of the first graphical user interface; and
generating a graphical display showing the arrangement of the components.

16. The apparatus of claim 11, further comprising:
a network interface configured to communicate data defining the first or second graphical user interface to an operator station for presentation to the user.

17. The apparatus of claim 11, wherein the at least one processing unit is further configured to present the first or second graphical user interface on a display to the user.

18. The apparatus of claim 11, wherein the at least one processing unit is configured to identify the device parameters and the device methods using a device description/electronic device description ("DD/EDD") file associated with the field device.

19. A non-transitory computer readable medium embodying a computer program, the computer program comprising computer readable program code for:
determining whether a user has requested use of a first device configuration associated with a field device in a process control system, the first device configuration identifying at least one of: (i) a subset of device parameters associated with the field device, (ii) a subset of device methods associated with the field device, and (iii) an interface arrangement of device parameters or methods associated with the field device;
if a determination is made that the user has requested use of the first device configuration:
retrieving a first value for each device parameter identified by the first device configuration; and
generating a first graphical user interface using the first device configuration and the first retrieved values; and
if a determination is made that the user has not requested use of the first device configuration:
retrieving a second value for each device parameter identified by a second device configuration, the second device configuration identifying (i) all of the device parameters associated with the field device and (ii) all of the device methods associated with the field device; and
generating a second graphical user interface using the second device configuration and the second retrieved values.

20. The computer readable medium of claim 19, wherein the computer program further comprises computer readable program code for generating the first device configuration by:
receiving an identification of a device type;
identifying at least one of the device parameters and the device methods using a device description associated with the device type; and
receiving information identifying at least one of: (i) the subset of device parameters, (ii) the subset of device methods, and (iii) the interface arrangement of device parameters or methods.

21. The computer readable medium of claim 19, wherein the computer program further comprises computer readable program code for:
identifying the device parameters and the device methods using a device description/electronic device description ("DD/EDD") file associated with the field device.

* * * * *